(12) United States Patent
Mueller et al.

(10) Patent No.: US 6,935,763 B2
(45) Date of Patent: Aug. 30, 2005

(54) INTERIOR LIGHTING SYSTEM OF A MOTOR VEHICLE AND A METHOD FOR CONTROLLING THE SAME

(75) Inventors: Michael Mueller, Gifhorn (DE); Mathias Hiller, Leiferde (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/204,084

(22) PCT Filed: Jan. 29, 2001

(86) PCT No.: PCT/EP01/00926

§ 371 (c)(1),
(2), (4) Date: Dec. 9, 2002

(87) PCT Pub. No.: WO01/60659

PCT Pub. Date: Aug. 23, 2001

(65) Prior Publication Data

US 2003/0142504 A1 Jul. 31, 2003

(30) Foreign Application Priority Data

Feb. 17, 2000 (DE) ......................... 100 06 943

(51) Int. Cl.[7] .............................. F21V 13/00
(52) U.S. Cl. ....................... 362/276; 362/230; 362/464; 362/490
(58) Field of Search ................................ 362/276, 802, 362/488–490, 230, 464, 501, 231, 295, 510; 315/77–83; 340/438, 455, 461, 691.6, 815.65, 555; 250/214, 200; 359/601, 616

(56) References Cited

U.S. PATENT DOCUMENTS 4,385,258 A * 5/1983 Voll ............................ 315/84
4,443,097 A * 4/1984 Nagasawa et al. ............. 355/68
4,962,302 A * 10/1990 Katsumi ....................... 236/13
5,143,437 A    9/1992 Matsuno et al.
5,949,346 A * 9/1999 Suzuki et al. ........... 340/815.45

FOREIGN PATENT DOCUMENTS

| DE | 3115446 | * 4/1981 | ............ B60Q/3/02 |
|----|---------|----------|----------------------|
| DE | 39 04 646 | 1/1992 | |
| DE | 42 32 545 | 3/1994 | |
| EP | 0 562 332 | 9/1993 | |
| EP | 0 772 378 | 5/1997 | |
| GB | 2 318 554 | 10/1996 | |
| JP | 5-270314 | 10/1993 | |
| RO | 113024 | 2/1997 | |

OTHER PUBLICATIONS

Patent Abstracts of Japan, vol. 018, No. 041 (M–1546), Jan. 21, 1994.

* cited by examiner

*Primary Examiner*—John Anthony Ward
*Assistant Examiner*—Mark Tsidulko
(74) *Attorney, Agent, or Firm*—Kenyon & Kenyon

(57) ABSTRACT

An interior lighting system for a motor vehicle includes a lighting device configured to light a motor vehicle interior and a control unit configured to regulate the brightness and/or the color of the light emitted from the lighting device. The color of the light emitted from the lighting device may be automatically adjusted in accordance with at least one operating parameter and/or at least one parameter associated with the environment of the motor vehicle. Such parameters include, for example, a deviation of an actual temperature from a predetermined desired temperature of the motor vehicle interior and/or the driving speed of the vehicle.

26 Claims, 2 Drawing Sheets

INTERIOR LIGHTING SYSTEM OF A MOTOR VEHICLE AND A METHOD FOR CONTROLLING THE SAME

FIELD OF THE INVENTION

The present invention relates to an interior-lighting system of a motor vehicle and a method for its control.

BACKGROUND INFORMATION

A typical interior lighting of a motor vehicle includes a lighting device disposed in the vehicle ceiling in the front area of the passenger compartment, emitting an essentially white light. Sometimes, additional light sources are assigned to this lighting device, for instance at the level of a rear seat bench or in the trunk. The interior lighting provides better orientation for persons getting in or out of the car as well as during loading and unloading of the vehicle. It is usually activated by the opening of a vehicle door, or by a central locking system of the vehicle with the aid of a control unit. The interior lighting comes on in response to a vehicle door being opened. After the door is closed, the interior lighting is turned off, directly or by a time delay, this sometimes being coupled to the starting of the engine.

After such a lighting device has been turned off, only an instrument light remains active whose brightness and—as known from European Published Patent Application No. 0 562 332—whose color can be manually adjusted. The instrument light and possibly additional lighting devices for operating controls such as the door handle and cigarette lighter are not used to illuminate the interior and are coupled to an activation of a vehicle's exterior lights.

The current interior-lighting systems for motor vehicles have the disadvantage that they are only activated in connection with the opening of a vehicle door and are turned off by the closing of the door, or by a brief delay, so that the interior remains dark during the predominant part of the actual vehicle operation. If an occupant wants to search for something or read a map in a dark vehicle environment, the interior lighting must be turned on manually, resulting in an attention loss for the traffic situation. Also, the stay in a dark environment is often perceived as unpleasant, and it promotes tiring of the driver as well.

In Japanese Published Patent Application No. 5-270314, an interior lighting for busses is described where a color of the light emitted by the lighting can be changed as a function of an outside temperature. At high outside temperatures, a light perceived as cool is provided and a light perceived as warm when the outside temperature is low. The disadvantage of this design is that an outside temperature bears no relationship to an inside temperature of a subjective temperature perception of an occupant. Therefore, the lighting might even be perceived as distracting, in an extreme case.

It is an object of the present invention to provide an interior lighting for motor vehicles and a method for its control by which it may be ensured that a vehicle occupant is provided with optimum lighting at all times, and thus has a sense of well-being while inside the motor vehicle.

SUMMARY

According to the present invention, at least one basic lighting of the interior is maintained while an occupant is present in the vehicle, by a light having a color that is perceived as pleasant. Therefore, the interior lighting system of a motor vehicle according to the present invention includes a lighting device, in which a color of a light emitted by the lighting device is automatically variable as a function of at least one operating parameter and/or at least one ambiency parameter of the motor vehicle.

According to an example embodiment of the present invention, the at least one ambiency parameter is the temperature prevailing outside the vehicle, measured by a temperature sensor.

In another example embodiment, at least one operating parameter of the motor vehicle that is controllable and/or controlled by a vehicle passenger is detected and the color of the light emitted by the lighting device is automatically varied as a function of the at least one operating parameter.

The present invention may provide an illumination of the vehicle interior by a light that allows a passenger to easily see things in the interior and to read maps, for instance, at least for a brief time, without straining his eyesight. Naturally, the lighting device may be disposed in such a manner, or its brightness be adjusted such that the driver does not encounter glare or that his perception is not impaired, and he is able to perceive the traffic conditions with sufficient contrast. By varying the color of the light emitted by the lighting device on the basis of at least one of the operating parameters controlled by the vehicle occupant, an atmosphere is created that is constantly adjusted to a subjective behavior and/or an occupant preference. This may contribute to the well-being of the vehicle's occupant and reduces stress, thereby actively increasing road safety.

In another example embodiment, the emitted color of the lighting device is variable as a function of a deviation of an instantaneous temperature from a setpoint temperature of the vehicle interior specified by a vehicle occupant. The interior-lighting system may include for this purpose a sensor for detecting an operating state of an air-conditioner or a heating system, an output signal of the sensor being an input for the control device. Alternatively, a temperature sensor for detecting a temperature of the interior may also be provided, the control unit comparing an output signal of the temperature sensor with a specified setpoint temperature. According to the present method, the light color of the second lighting device is varied as a function of the operating state of the air-conditioner or the heating system, or the deviation from the setpoint value. According to an example embodiment, a color perceived as cool may be set if a cooling of the air-conditioner, a non-heating of the heating system or an exceeding of the setpoint temperature is detected. Conversely, a color perceived as warm is set when a heating of the air-conditioner or the heating system, or an undershooting of the setpoint temperature, is present. In this manner, deviations of the vehicle's inside temperature from a temperature individually preferred by the occupants may be compensated for, at least to some extent.

In another example embodiment of the present invention, the color emitted by the lighting device may be variable as a function of a speed of the motor vehicle specified by the car's driver. For this purpose, the interior-lighting system includes a sensor for detecting the vehicle speed, whose output signal is an input to the control unit. This sensor may be an already present tacho sensor, for instance. It may be provided that a color be set that promotes concentration and/or is calming when a vehicle speed exceeds a specified threshold value. Green, for instance, is known as a color having such an effect. In contrast, blue light has proven to promote concentration at low speeds.

It is possible to optionally implement either the temperature-regulated or the speed-regulated color control of the lighting device, or a combination of both. In the latter case, it may be provided, for example, that the light management be implemented in a temperature-dependent manner below a specified speed threshold, and, if this threshold is exceeded, the lighting is controlled to green light, based on speed.

According to an example embodiment, the lighting device includes at least two light sources, which may be controlled independently of one another, the at least two light sources emitting light of different colors. The color altogether emitted by the lighting device may be varied by increasing the brightness of a first light source and decreasing the brightness of a second light source. According to an example embodiment, a first light source of the lighting device emits white light, and the additional light source(s) emit(s) light of a different color. A white light of the lighting device is produced by increasing a brightness of the first light source and by decreasing the brightness of the at least one second light source, or by turning it off. An alternative example embodiment of the interior-lighting system may provide a white light of the lighting device to be producible by superimposing a plurality of light sources on the light. This may easily be accomplished by three light sources, which, for instance, emit light in the three basic colors red, yellow and blue which, when superposed, produce white light. By an appropriate mixing of these light sources, any desired other light color may be created.

In addition to the lighting device capable of producing variable light color, the interior lighting system may also include a standard lighting device, which essentially emits white light and whose brightness is controllable as a function of a vehicle door and/or a central locking system. If such a lighting system is provided, which supplies an interior lighting by a bright white light when a passenger exits or enters, it is possible to omit the possibility of the first light producing white light according to present invention.

According to the present invention, the lighting device may include diffuse interior lighting, an indirect comfort light, a footwell light, a door-handle light, or a combination of these. In particular, the brightness of these components may also be controlled independently of one another.

According to another example embodiment, the lighting device may be manually controlled by the vehicle occupants. In this context, it may be provided that the vehicle occupant is able to control the brightness or the color tone of the lighting device, or both, at any time.

According to an example embodiment, the interior-lighting system is turned on by the opening of a vehicle door, and is controlled to a bright and essentially white light. As already described, this white interior lighting may be implemented either by an additional standard lighting device or the appropriately designed lighting device according to the present invention. The lighting device may be controlled to a colored subdued light by closing the vehicle door, or by a specified delay, at the latest, however, by starting the engine. This may only occur when an occupant is inside the vehicle or until the vehicle is locked. Additionally, while the vehicle is operated the activation of the lighting device may also be made dependent on an exterior lighting of the vehicle being turned off. Given sufficient ambient light, an unnecessary turning on of the lighting device may be prevented in this manner.

DETAILED DESCRIPTION

Figure 1:
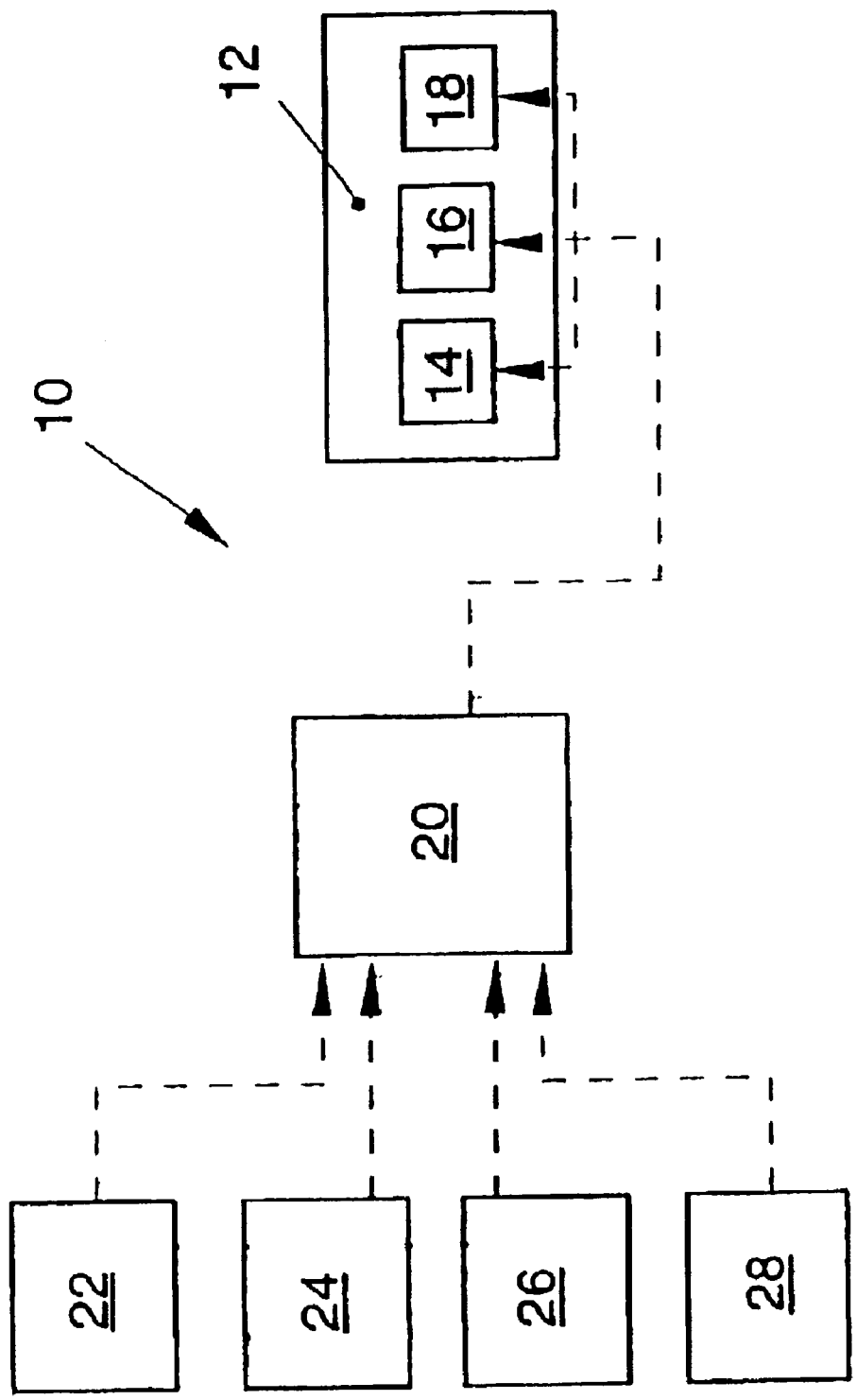
FIG. 1 is a schematic view of an interior lighting device according to an example embodiment of the present invention.

According to the example embodiment illustrated in FIG. 1, the interior-lighting system of a motor vehicle denoted as a whole by reference numeral 10, includes three light sources 14, 16, 18. The three light sources 14, 16, 18 each emit a light of a different color. According to the illustrated example embodiment, these are the basic colors red, yellow and blue. The brightness of the three light sources 14, 16, 18 may be controlled independently of one another by control device 20. A color of a light emitted altogether by lighting device 12 may be varied by decreasing or increasing the brightness of one or a plurality of light sources 14, 16, 18. A white light of lighting device 12 results from superimposing identical light intensities of the three light sources 14, 16, 18. The color of the light emitted by lighting device 12 is automatically varied as a function of at least one of the motor vehicle's operating parameters controlled by a vehicle occupant. For example, the light color is varied as a function of a deviation between an instantaneous temperature and a setpoint temperature of the vehicle interior specified by a vehicle occupant. For this purpose, interior lighting system 10 includes a sensor 22, which detects an operating state of an air-conditioner and transmits an output signal to control unit 20. If sensor 22 detects a heating of the air-conditioner, control unit 20 controls lighting device 12 to a color perceived as warm, e.g., a red tone, since a temperature of the vehicle interior apparently is below a setpoint temperature specified by a vehicle occupant. Conversely, a color perceived as cool, for instance blue, of lighting device 12 is set when sensor 22 detects a non-heating of the air-conditioner. In addition, the color of lighting device 12 may be controlled as a function of a vehicle speed. For this purpose, sensor 24, which may be a tacho sensor, for instance, transmits the instantaneous vehicle speed to control device 20 which—if a specified speed threshold has been exceeded—specifies a light color which promotes concentration and/or has a calming effect, e.g., a green light. The light color of lighting device 12 may also be varied solely as a function of temperature or speed.

A sensor 26 registers an opening or closing of the vehicle doors. In addition, it may also be coupled to a central locking system. As soon as sensor 26 detects an opening of a vehicle door or an unlocking of the vehicle locking system, control device 20 turns on lighting device 12 and controls it to a light and essentially white light, so that an orientation of an occupant during entering and exiting, or during a loading procedure, is facilitated. In response to the closing of the vehicle door, possibly by a brief delay or by starting the engine, the brightness of lighting system 12 is reduced and a color of the emitted light is regulated as a function of the signals of sensors 22, 24. In order to avoid an unnecessary operation of lighting device 12, it may additionally be made dependent on an outside brightness, which is most easily detected by a sensor 28, which determines whether an exterior lighting of the vehicle is turned on or off.

Figure 2:
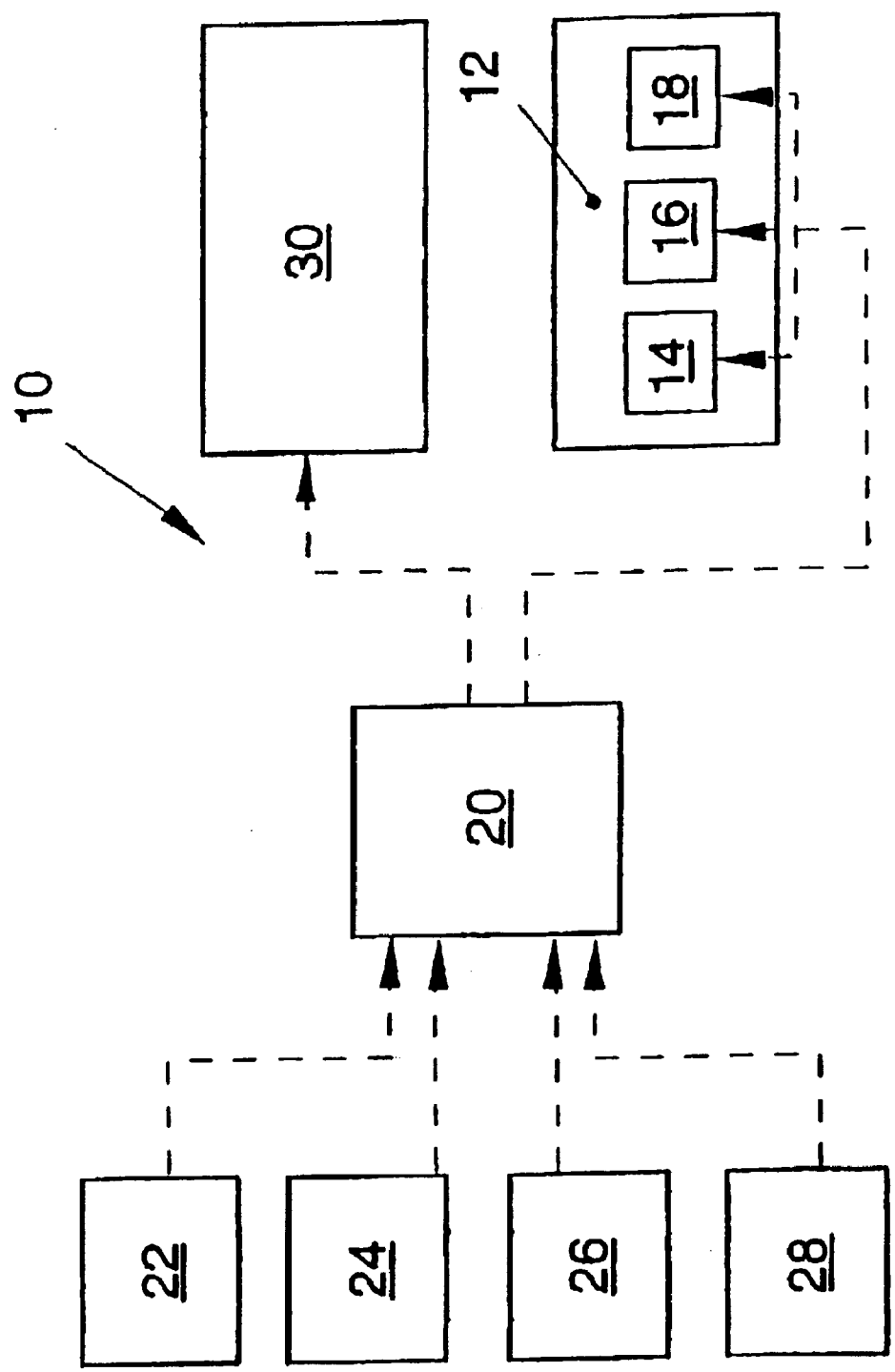
FIG. 2 is a schematic view of an interior lighting device according to another example embodiment of the present invention.

Another example embodiment of an interior-lighting system according to the present invention is illustrated in FIG. 2. Elements that are identical to FIG. 1 are denoted by identical reference numerals. According to this example embodiment, interior-lighting system 10, in addition to lighting device 12, includes a standard lighting device 30, which may correspond to a conventional interior lighting. Standard lighting device 30 emits an essentially white light and may be controlled as a function of the state of the vehicle doors or the vehicle locking system detected by sensor 26. While vehicle occupants enter, standard lighting device 30, e.g., disposed on the vehicle rooflining, illuminates the interior. After the vehicle door has been closed or after the engine has been started, the brightness of standard lighting device 30 is abruptly or incrementally controlled downwardly, while the brightness of lighting device 12 is conversely increased. During vehicle operation, the color of the light emitted by lighting device 12 is controlled, in the manner already described, as a function of the air-conditioner (sensor 22) and/or the vehicle speed (sensor 24).

In the example embodiment of the present invention illustrated in FIG. 2, lighting device 12 may include, for example, an indirect comfort light, a footwell light and/or a door-handle light. On the other hand, according to the example embodiment illustrated in FIG. 1, lighting device 12 may additionally include a diffuse interior lighting, which may provide the illumination required during entering and exiting as well as loading and unloading.

LIST OF REFERENCE NUMERALS

10 interior-lighting system
12 lighting device
14 light source
16 light source
18 light source
20 control device
22 sensor (air-conditioner/heating system)
24 sensor (vehicle speed)
26 sensor (vehicle door)
28 sensor (exterior lighting)
30 standard lighting device

What is claimed is:

1. An interior-lighting system for a vehicle, comprising:
   a lighting device adapted to illuminate a motor vehicle interior with ambient light; and
   a control unit configured to regulate at least one of a brightness and a color of the ambient light emitted by the lighting device to illuminate the motor vehicle interior, the control unit configured to automatically vary the at least one of the brightness and the color of the ambient light as a function of at least one operating parameter of the motor vehicle that is at least one of controllable and controlled by a motor vehicle occupant.

2. The interior-lighting system according to claim 1, further comprising a temperature sensor configured to measure an outside temperature, the control unit configured to regulate the at least one of the brightness and the color in accordance with the measured outside temperature.

3. The interior-lighting system according to claim 1, wherein the control unit is configured to vary the color of the ambient light as a function of a deviation between an instantaneous temperature and a setpoint temperature of the motor vehicle interior specified by the motor vehicle occupant.

4. The interior-lighting system according to claim 1, wherein the control unit is configured to vary the color of the ambient light as a function of a speed of the motor vehicle specified by a motor vehicle driver.

5. The interior-lighting system according to claim 4, further comprising a sensor configured to detect a speed of the motor vehicle, wherein an output signal from the sensor is an input to the control unit.

6. The interior-lighting system according to claim 1, wherein the lighting device includes at least two light sources configured to emit a different color, the control unit configured to independently control each light source.

7. The interior-lighting system according to claim 6, wherein a first light source is configured to emit white light.

8. The interior-lighting system according to claim 6, wherein the lighting device includes a plurality of light sources configured to produce white light by superimposition of light emitted by the light sources.

9. The interior-lighting system according to claim 1, wherein the lighting device includes at least one of an indirect comfort light, a footwell light, a door-handle light and a diffuse interior lighting.

10. The interior-lighting system according to claim 1, wherein the lighting device is manually controllable.

11. An interior-lighting system for a vehicle, comprising:
    a lighting device configured to illuminate a motor vehicle interior with ambient light;
    a control unit configured to regulate at least one of a brightness and a color of the ambient light emitted by the lighting device to illuminate the motor vehicle interior, the control unit configured to automatically vary the at least one of the brightness and the color of the ambient light as a function of at least one operating parameter of the motor vehicle that is at least one of controllable and controlled by a motor vehicle occupant; and
    a sensor configured to detect an operating state of one of an air-conditioner and a heating system;
    wherein the control unit is configured to vary the color of the ambient light as a function of a deviation between an instantaneous temperature and a setpoint temperature of the motor vehicle interior specified by the motor vehicle occupant; and
    wherein an output signal of the sensor is an input to the control device.

12. The interior-lighting system according to claim 3, further comprising a temperature sensor configured to detect a temperature of the interior of the motor vehicle, wherein an output signal from the temperature sensor is an input to the control device.

13. A method for controlling an interior-lighting system of a motor vehicle having a lighting device, at least one of a brightness and a color of ambient light emitted by the lighting device being regulatable, comprising the steps of:
    detecting at least one operating parameter that is at least one of controllable and controlled by a motor vehicle occupant at a control unit; and
    automatically varying at least one of the brightness and the color of the ambient light emitted by the lighting device as a function of the at least one operating parameter.

14. The method according to claim 13, further comprising the step of detecting an outside temperature, the color of the ambient light varied in the automatically varying step as a function of the detected outside temperature.

15. The method according to claim 13, wherein the color of the ambient light is varied in the automatically varying step as a function of one of an operating state of at least one of an air-conditioner and a heating system and a deviation of an instantaneous temperature from a setpoint temperature of an interior of the motor vehicle.

16. The method according to claim 15, wherein the automatically varying step includes the substeps of:
    setting a color perceived as cold in accordance with a detection of one of a cooling of the air-conditioner, a non-heating of the heating system and an exceeding of the setpoint temperature; and setting a color perceived as warm in accordance with a detection of a heating of the air-conditioner, a heating of the heating system and an undershooting of the setpoint temperature.

17. The method according to claim 13, wherein the automatically varying step includes the substep of varying the color of the ambient light as a function of a motor vehicle speed.

18. The method according to claim 13, further comprising the step of activating the interior-lighting system by opening a motor vehicle door, the automatically varying step including the substep of regulating the interior lighting system to a substantially white, bright light in accordance with the activating step.

19. A method for controlling an interior-lighting system of a motor vehicle having a lighting device, at least one of a brightness and a color of ambient light emitted by the lighting device being regulatable, comprising the steps of:

detecting at least one operating parameter that is at least one of controllable and controlled by a motor vehicle occupant at a control unit; and automatically varying at least one of the brightness and the color of the light emitted by the lighting device as a function of the at least one operating parameter;

wherein the automatically varying step includes the substep of varying the color of the ambient light as a function of a motor vehicle speed; and wherein the automatically varying step includes the substep of setting at least one of a color promoting concentration and a calming color when the motor vehicle speed exceeds a specified threshold value.

20. A method for controlling an interior-lighting system of a motor vehicle having a lighting device, at least one of a brightness and a color of light emitted by the lighting device being regulatable, comprising the steps of:

detecting at least one operating parameter that is at least one of controllable and controlled by a motor vehicle occupant at a control unit; and automatically varying at least one of the brightness and the color of the light emitted by the lighting device as a function of the at least one operating parameter;

wherein the lighting device includes at least two light sources configured to emit light of different colors, the automatically varying step including the substep of changing the color by increasing a brightness of a first light source and decreasing the brightness of a second light source.

21. The method according to claim 20, wherein the first light source is configured to emit white light, the automatically varying step including the substep of producing white light by increasing the brightness of the first light source and decreasing the brightness of at least one second light source.

22. The method according to claim 20, wherein the automatically varying step includes the substep of producing white light by superimposing light emitted by a plurality of light sources.

23. A method for controlling an interior-lighting system of a motor vehicle having a lighting device, at least one of a brightness and a color of ambient light emitted by the lighting device being regulatable, comprising the steps of:

detecting at least one operating parameter that is at least one of controllable and controlled by a motor vehicle occupant at a control unit;

automatically varying at least one of the brightness and the color of the light emitted by the lighting device as a function of the at least one operating parameter; and activating the interior-lighting system by opening a motor vehicle door;

wherein the automatically varying step includes the substep of regulating the interior lighting system to a substantially white, bright light in accordance with the activating step; and wherein the automatically varying step includes the substep of regulating the lighting device to a colored, subdued light in accordance with a presence of an occupant in the vehicle by one of closing a motor vehicle door, a specified delay and starting a motor vehicle engine.

24. A method for controlling an interior-lighting system of a motor vehicle having a lighting device, at least one of a brightness and a color of light emitted by the lighting device being regulatable, comprising the steps of:

activating the lighting device only during operation of the motor vehicle with an exterior lighting device of the motor vehicle being on;

detecting at least one operating parameter that is at least one of controllable and controlled by a motor vehicle occupant at a control unit; and automatically varying at least one of the brightness and the color of the light emitted by the lighting device as a function of the at least one operating parameter.

25. An interior-lighting system for a vehicle, comprising a lighting device adapted to illuminate a motor vehicle interior with ambient light; and a control unit configured to regulate at least one of a brightness and a color of the ambient light emitted by the lighting device to illuminate the motor vehicle interior, the control unit configured to automatically vary the at least one of the brightness and the color of the ambient light as a function of at least one operating parameter of the motor vehicle that is at least one of controllable and controlled by a motor vehicle occupant;

wherein the lighting device includes at least one of: (a) a diffuse interior lighting device; (b) an indirect comfort light; (c) a footwell light; and (d) a door-handle light.

26. A method for controlling an interior-lighting system of a motor vehicle having a lighting device, at least one of a brightness and a color of ambient light emitted by the lighting device being regulatable, comprising the steps of:

detecting at least one operating parameter that is at least one of controllable and controlled by a motor vehicle occupant at a control unit; and automatically varying at least one of the brightness and the color of the ambient light emitted by the lighting device as a function of the at least one operating parameter;

wherein the lighting device includes at least one of: (a) a diffuse interior lighting device; (b) an indirect comfort light; (c) a footwell light; and (d) a door-handle light.

* * * * *